United States Patent
Ding et al.

(10) Patent No.: US 12,182,897 B2
(45) Date of Patent: Dec. 31, 2024

(54) METHODS AND SYSTEMS FOR PROTECTING DIGITAL CONTENT AGAINST ARTIFICIAL INTELLIGENCE-BASED UNAUTHORIZED MANIPULATION OF THE DIGITAL CONTENT

(71) Applicant: Accenture Global Solutions Limited, Dublin (IE)

(72) Inventors: Leah Ding, North Potomac, MD (US); Xiaoyong Yuan, Gainesville, FL (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 1033 days.

(21) Appl. No.: 17/248,016

(22) Filed: Jan. 5, 2021

(65) Prior Publication Data

US 2021/0209203 A1    Jul. 8, 2021

Related U.S. Application Data

(60) Provisional application No. 62/957,672, filed on Jan. 6, 2020.

(51) Int. Cl.
*G06F 21/16* (2013.01)
*G06T 1/00* (2006.01)
(Continued)

(52) U.S. Cl.
CPC ............ *G06T 1/0028* (2013.01); *G06F 21/16* (2013.01); *G06T 5/20* (2013.01); *G06T 5/92* (2024.01);
(Continued)

(58) Field of Classification Search
CPC .......... G06T 1/0028; G06T 5/20; G06T 5/92; G06T 2201/0201; G06F 21/16;
(Continued)

(56) References Cited

U.S. PATENT DOCUMENTS 5,875,249 A  *  2/1999  Mintzer ................ G06T 1/0021
                                                            380/54
6,510,233 B1 *  1/2003  Nakano ................ G06T 1/0021
                                                            713/176
(Continued)

OTHER PUBLICATIONS

Segalis et al., OGAN: Disrupting Deepfakes with an Adversarial Attack that Survives Training, Nov. 2020, arXIV.*
(Continued)

*Primary Examiner* — David Garcia Cervetti
(74) *Attorney, Agent, or Firm* — Polsinelli PC

(57) ABSTRACT

A device may receive digital content and may process the digital content, with at least one of an optimization-based poisoning model or a statistical-based poisoning model, to generate at least one of first poisoning data or second poisoning data, respectively. The device may generate new digital content based on the digital content and the at least one of the first poisoning data or the second poisoning data. The device may provide the new digital content to one or more devices to be accessed by at least one deepfake model used to create fake digital content and may perform one or more actions based on the new digital content.

19 Claims, 10 Drawing Sheets

(51) Int. Cl.
*G06T 5/20* (2006.01)
*G06T 5/92* (2024.01)
*G06V 10/42* (2022.01)
*G06V 10/74* (2022.01)
*G06V 10/75* (2022.01)
*G06V 10/776* (2022.01)
*G06F 21/10* (2013.01)

(52) U.S. Cl.
CPC ............ *G06V 10/42* (2022.01); *G06V 10/757* (2022.01); *G06V 10/761* (2022.01); *G06V 10/776* (2022.01); *G06F 21/106* (2023.08)

(58) Field of Classification Search
CPC ........ G06F 21/106; G06F 18/22; G06F 18/23; G06F 21/31; G06V 10/42; G06V 10/757; G06V 10/761; G06V 10/776; G06V 20/95; G06N 20/00
See application file for complete search history.

(56) References Cited

U.S. PATENT DOCUMENTS

| | | | |
|---|---|---|---|
| 10,650,121 B1* | 5/2020 | Wei | G06T 11/60 |
| 10,817,990 B1* | 10/2020 | Yang | G06T 3/4053 |
| 10,951,958 B1* | 3/2021 | Arana | H04N 21/23418 |
| 10,964,006 B2* | 3/2021 | Nießner | G06V 10/462 |
| 11,188,798 B1* | 11/2021 | Goswami | G06N 3/08 |
| 11,315,358 B1* | 4/2022 | Lo | G06V 40/1388 |
| 11,341,179 B1* | 5/2022 | Brandwine | G06F 16/532 |
| 11,430,102 B1* | 8/2022 | Dolhansky | G06V 10/7747 |
| 11,463,455 B1* | 10/2022 | Huang | G06V 30/12 |
| 2008/0069396 A1* | 3/2008 | He | G06T 1/0028 382/100 |
| 2010/0158311 A1* | 6/2010 | Takahashi | H04N 1/32309 382/298 |
| 2014/0098985 A1* | 4/2014 | Brubeck | G06T 1/0028 382/100 |
| 2015/0341339 A1* | 11/2015 | Hu | H04L 63/0807 713/172 |
| 2016/0071229 A1* | 3/2016 | Beaubien | G06T 1/0028 382/100 |
| 2017/0034542 A1* | 2/2017 | Yabu | H04N 21/234 |
| 2017/0053104 A1* | 2/2017 | Koch | G06F 21/16 |
| 2017/0053372 A1* | 2/2017 | Koch | G06F 3/04842 |
| 2017/0134406 A1* | 5/2017 | Guo | H04L 63/123 |
| 2017/0339213 A1* | 11/2017 | Dukatz | H04L 67/06 |
| 2019/0138840 A1* | 5/2019 | Hougen | G06T 7/60 |
| 2019/0205558 A1* | 7/2019 | Gonzales, Jr. | G06F 21/602 |
| 2019/0286911 A1* | 9/2019 | Smith | G06V 10/56 |
| 2019/0370440 A1* | 12/2019 | Gu | G06N 3/048 |
| 2019/0377905 A1* | 12/2019 | Rose | G06F 21/64 |
| 2020/0019821 A1* | 1/2020 | Baracaldo-Angel | G06F 18/10 |
| 2020/0065526 A1* | 2/2020 | Berman | G06T 1/0028 |
| 2020/0162236 A1* | 5/2020 | Miller | G06F 40/174 |
| 2020/0162266 A1* | 5/2020 | Miller | H04L 9/3239 |
| 2020/0327410 A1* | 10/2020 | Fairhart | G06N 3/08 |
| 2020/0364857 A1* | 11/2020 | Moen | G06F 18/2413 |
| 2020/0380118 A1* | 12/2020 | Miller | G06N 3/045 |
| 2020/0387608 A1* | 12/2020 | Miller | G06N 3/04 |
| 2021/0019617 A1* | 1/2021 | Bang | G06N 3/084 |
| 2021/0042529 A1* | 2/2021 | Price | G06V 20/46 |
| 2021/0050025 A1* | 2/2021 | Huffman | G06N 3/045 |
| 2021/0081831 A1* | 3/2021 | Angel | G06N 20/00 |
| 2021/0097260 A1* | 4/2021 | Verma | G06V 40/45 |
| 2021/0097382 A1* | 4/2021 | Mathews | G06N 3/08 |
| 2021/0112306 A1* | 4/2021 | Ye | H04N 21/4542 |
| 2021/0117650 A1* | 4/2021 | Ye | G06T 7/97 |
| 2021/0117690 A1* | 4/2021 | Ye | G06V 40/176 |
| 2021/0124775 A1* | 4/2021 | Ur | H04N 9/8042 |
| 2021/0124996 A1* | 4/2021 | Breugelmans | G06V 10/764 |
| 2021/0142065 A1* | 5/2021 | Price | G06V 20/46 |
| 2021/0209203 A1* | 7/2021 | Ding | G06T 5/92 |
| 2021/0224596 A1* | 7/2021 | McDevitt | G06N 5/046 |
| 2021/0314658 A1* | 10/2021 | Ye | H04N 21/278 |
| 2021/0319240 A1* | 10/2021 | Demir | G06N 3/045 |
| 2021/0357533 A1* | 11/2021 | Britton | G06T 7/90 |
| 2021/0406568 A1* | 12/2021 | Liberman | G06Q 20/3821 |
| 2022/0019663 A1* | 1/2022 | Stapleton | G06F 21/554 |
| 2022/0044020 A1* | 2/2022 | Sasao | G06V 10/774 |
| 2022/0129664 A1* | 4/2022 | Li | G06V 40/193 |
| 2022/0148241 A1* | 5/2022 | Park | G06T 5/60 |
| 2022/0148242 A1* | 5/2022 | Russell | G06N 3/084 |
| 2022/0245243 A1* | 8/2022 | Andreina | G06N 3/094 |
| 2022/0262148 A1* | 8/2022 | Lee | G06N 20/00 |
| 2022/0286491 A1* | 9/2022 | White | H04N 21/4126 |
| 2023/0260611 A1* | 8/2023 | Lee | A61B 5/7267 382/159 |
| 2023/0281461 A1* | 9/2023 | Woo | G06N 3/0464 706/25 |
| 2023/0401824 A1* | 12/2023 | Khan | G06V 20/70 |
| 2024/0056478 A1* | 2/2024 | Keiter | G06Q 50/01 |

OTHER PUBLICATIONS

Carter et al., Approaches for Fake Content Detection: Strengths and Weaknesses to Adversarial Attacks, Apr. 2021, IEEE.*

Shen et al., TensorClog: An Imperceptible Poisoning Attack on Deep Neural Network Applications, Mar. 2019, IEEE.*

* cited by examiner

METHODS AND SYSTEMS FOR PROTECTING DIGITAL CONTENT AGAINST ARTIFICIAL INTELLIGENCE-BASED UNAUTHORIZED MANIPULATION OF THE DIGITAL CONTENT

CROSS-REFERENCE TO RELATED APPLICATION

This Patent Application claims priority to U.S. Provisional Patent Application No. 62/957,672, filed on Jan. 6, 2020, and entitled "METHODS AND SYSTEMS FOR PROTECTING DIGITAL CONTENT AGAINST ARTIFICIAL INTELLIGENCE-BASED COPYRIGHT INFRINGEMENT." The disclosure of the prior Application is considered part of and is incorporated by reference into this Patent Application.

BACKGROUND

Digital content is any content that exists in the form of digital data. Digital content is stored on digital or analog storage in specific formats, and forms of digital content include information that is digitally broadcast, streamed, or contained in computer files.

SUMMARY

In some implementations, a method may include receiving digital content, and processing the digital content, with at least one of an optimization-based poisoning model or a statistical-based poisoning model, to generate at least one of first poisoning data or second poisoning data, respectively. The method may include generating new digital content based on the digital content and the at least one of the first poisoning data or the second poisoning data, and providing the new digital content to one or more devices to be accessed by at least one deepfake model used to create fake digital content. The method may include performing one or more actions based on the new digital content.

In some implementations, a device includes one or more memories, and one or more processors to receive digital content, and process the digital content, with at least one of an optimization-based poisoning model or a statistical-based poisoning model, to generate at least one of first poisoning data or second poisoning data, respectively. The one or more processors may generate new digital content based on the digital content and the least one of the first poisoning data or the second poisoning data, and may provide the new digital content to one or more devices to be accessed by at least one artificial intelligence model used to create fake digital content. The one or more processors may perform one or more actions based on the new digital content.

In some implementations, a non-transitory computer-readable medium may store a set of instructions that includes one or more instructions that, when executed by one or more processors of a device, cause the device to receive digital content, and process the digital content, with at least one of an optimization-based poisoning model or a statistical-based poisoning model, to generate at least one of first poisoning data or second poisoning data, respectively. The one or more instructions may cause the device to generate new digital content based on the digital content and the at least one of the first poisoning data or the second poisoning data. The one or more instructions may cause the device to provide the new digital content to one or more devices to be accessed by at least one deepfake model, used to create fake digital content, to cause degraded fake digital content to be generated by the at least one deepfake model.

DETAILED DESCRIPTION

Figure 1A:
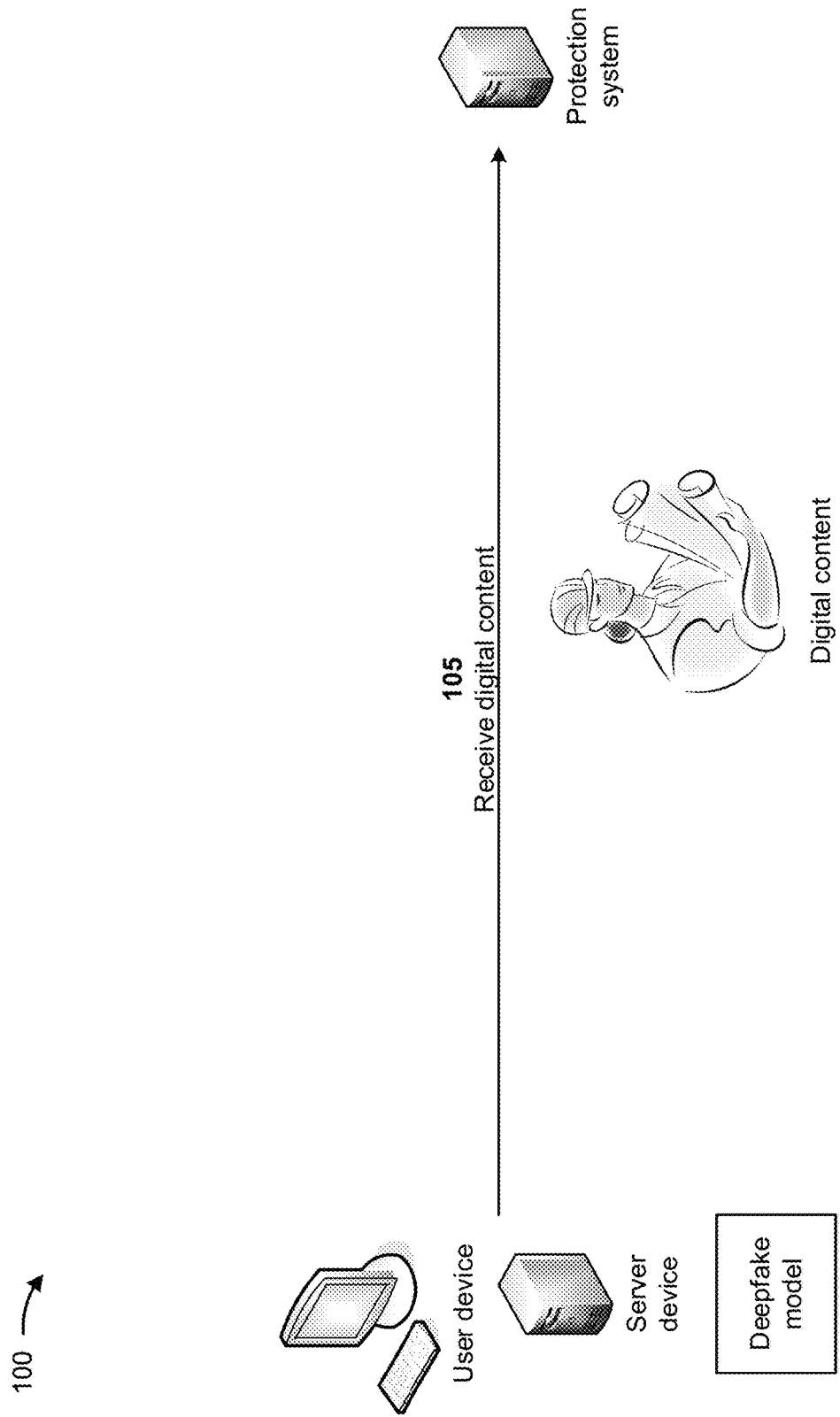
FIGS. 1A-1F are diagrams of an example implementation described herein.

The following detailed description of example implementations refers to the accompanying drawings. The same reference numbers in different drawings may identify the same or similar elements.

In today's world, digital content (e.g., images, audio, video, and/or the like) can be manipulated with artificial intelligence-based solutions. For example, an image (e.g., a company's design sketches) can be manipulated by artificial intelligence (e.g., a deepfake model) to generate substantially similar images (e.g., designs) that infringe design sketches. Audio can be manipulated by artificial intelligence for voice impersonation. Moreover, images and videos can be combined and superimposed onto source images or videos using artificial intelligence. Such capabilities of artificial intelligence have been used to create fake celebrity videos, fake news, malicious hoaxes, and/or the like. A deepfake model is an artificial intelligence-based technology (e.g., deep learning technology) used to produce or alter digital content so that the digital content presents a scene or event that did not, in fact, occur. Thus, artificial intelligence-based unauthorized manipulation of the digital content wastes computing resources (e.g., processing resources, memory resources, communication resources, and/or the like), networking resources, human resources, and/or the like associated with managing digital content, policing unauthorized manipulation of the digital content, correcting misconceptions about manipulated digital content, and/or the like.

Some implementations described herein relate to a protection system that protects digital content against artificial intelligence-based unauthorized manipulation of the digital content. For example, the protection system may receive digital content and may process the digital content, with at least one of an optimization-based poisoning model or a statistical-based poisoning model, to generate at least one of first poisoning data or second poisoning data, respectively. The protection system may generate new digital content based on the digital content and the at least one of the first poisoning data or the second poisoning data. The protection system may provide the new digital content to one or more devices to be accessed by at least one deepfake model used to create fake digital content. The protection system may perform one or more actions based on the new digital content.

In this way, the protection system protects digital content against artificial intelligence-based unauthorized manipulation of the digital content. The protection system may process digital content, with a poisoning model, to generate poisoning data, may generate new digital content based on the digital content and the poisoning data, and may provide the new digital content to a deepfake model. The poisoning data may include visually unnoticeable noise and/or changes that prevent artificial intelligence tools (e.g., deepfake models) from generating an irrelevant, malicious, or infringing content. The poisoning data added to the digital content is impossible to detect visually for the digital content, and thus, does not impact legitimate uses of the digital content. In addition, the poisoning data cannot be removed by the unauthorized parties, and thus, protects the digital content against unauthorized manipulation. This, in turn, conserves computing resources, networking resources, human resources, and/or the like that would otherwise have been wasted in managing digital content, policing unauthorized manipulation of the digital content, correcting misconceptions about manipulated digital content, and/or the like.

FIGS. 1A-1F are diagrams of an example 100 associated with protecting digital content against artificial intelligence-based unauthorized manipulation of the digital content. As shown in FIGS. 1A-1F, example 100 includes a user device and a server device associated with a protection system. The user device may include a laptop computer, a mobile telephone, a desktop computer, and/or the like that stores digital content. The server device may include a server, an application server, a client server, a web server, and/or the like that stores digital content. The protection system may include a system that protects digital content against artificial intelligence-based (e.g., deepfake model-based) unauthorized manipulation of the digital content. In some implementations, an artificial intelligence-based model (e.g., a deepfake model) may access the digital content of the user device or the server device to generate fake or malicious digital content from the digital content. For example, the deepfake model may be associated with a malicious actor that utilizes the deepfake model for copyright infringement, to create fake celebrity videos, to create fake news, to generate malicious hoaxes, and/or the like.

As shown in FIG. 1A, and by reference number 105, the protection system may receive digital content from the user device and/or the server device. The digital content may include audio, images, video, and/or the like. In some implementations, the digital content includes legitimate digital content (e.g., images of famous people, videos of famous people, and/or the like) to be protected. An owner of the digital content may wish to protect the digital content from the malicious actor that utilizes the deepfake model for copyright infringement, to create fake celebrity videos, to create fake news, to generate malicious hoaxes, and/or the like.

Figure 1B:
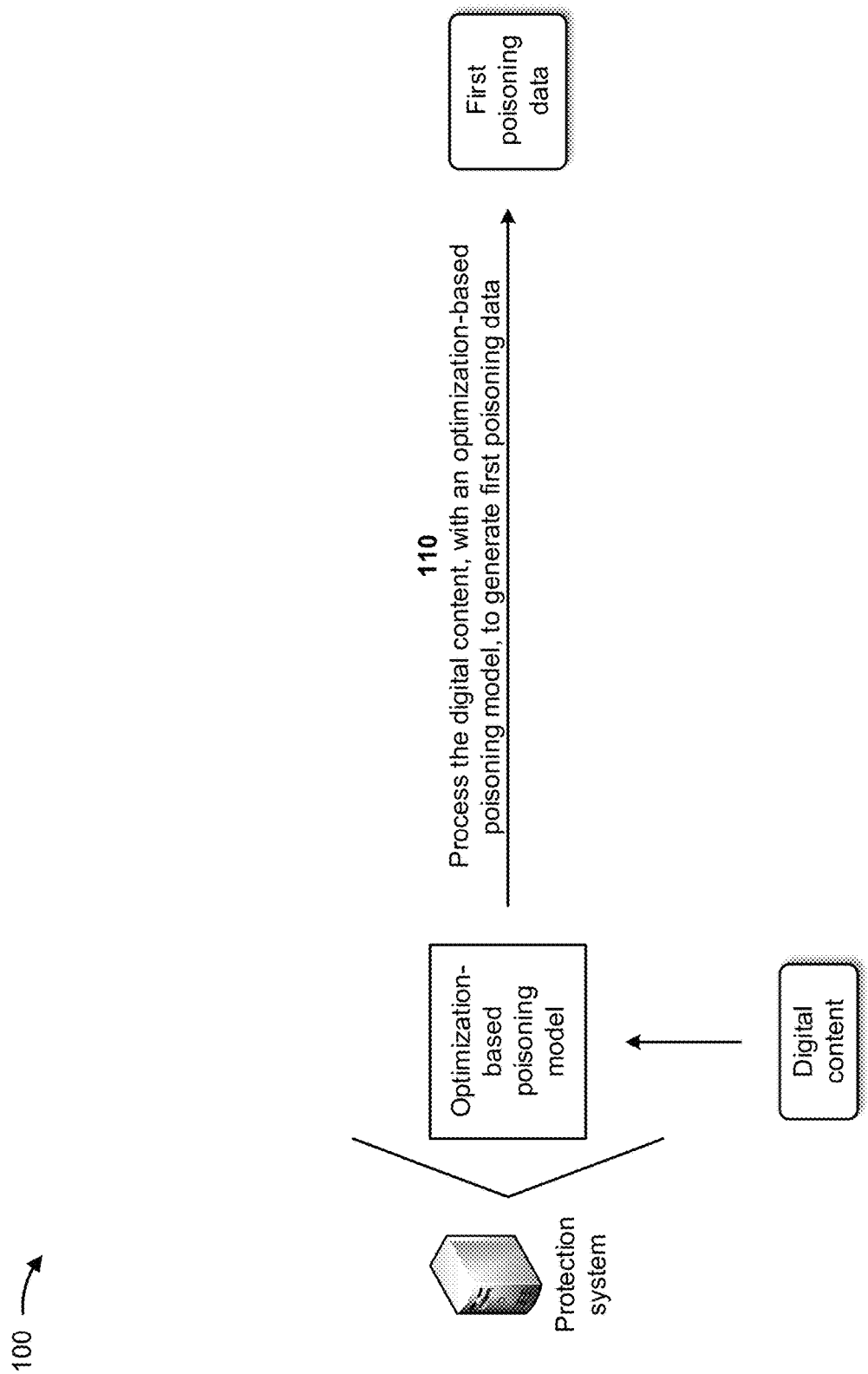

As shown in FIG. 1B, and by reference number 110, the protection system may process the digital content, with an optimization-based poisoning model, to generate first poisoning data. In some implementations, the optimization-based poisoning model includes a back-gradient optimization poisoning model. The optimization-based poisoning model may manipulate or poison a few pixels in the digital content (e.g., an original image or frame) so that the manipulated digital content (e.g., the first poisoning data) is undetectable to a human eye. The optimization-based poisoning model may iteratively optimize one poisoning sample (e.g., a pixel) at a time through a gradient ascent to maximize a loss function of one or more deepfake models. In each iteration, the optimization-based poisoning model may optimize all poisoning pixels by updating feature vectors of the poisoning pixels one at a time. For example, the optimization-based poisoning model may identify pixels that need to be changed (e.g., if pixel X has higher loss function than pixel Y, then select pixel X), and may update feature vectors for pixel X (e.g., which will change how the deepfake model processes pixel X). A maximum threshold of pixels to be poisoned by the optimization-based poisoning model may depend on original content (e.g., the digital content).

Figure 1C:
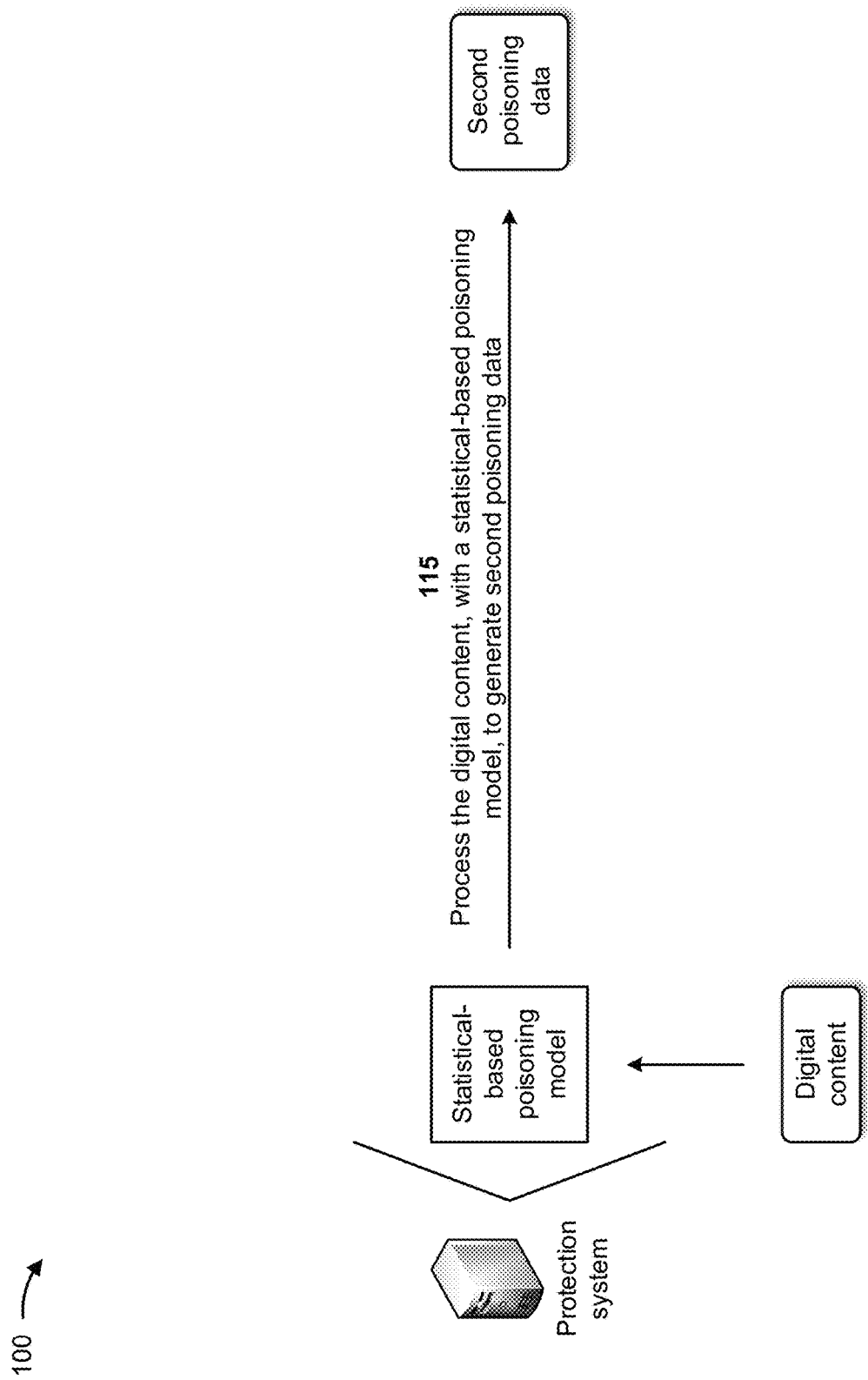

As shown in FIG. 1C, and by reference number 115, the protection system may process the digital content, with a statistical-based poisoning model, to generate second poisoning data. In some implementations, the protection system processes the digital content with just the optimization-based poisoning model, with just the statistical-based poisoning model, or with both the optimization-based poisoning model and the statistical-based poisoning model. In some implementations, the statistical-based poisoning model includes a multivariate normal distribution model.

The statistical-based poisoning model may receive a sample taken from a multivariate normal distribution with a mean and a covariance estimated from clean digital content to be protected (e.g., the digital content). The statistical-based poisoning model may round feature values of the sample to corners in order to identify a portion of the sample that poisons pixels of the digital content. The statistical-based poisoning model may select a response variable value of the sample (e.g., at a boundary to maximize loss) to identify pixels of the digital content to poison. The statistical-based poisoning model may update feature vectors of the identified pixels so that the identified pixels of the digital content are poisoned with the portion of the sample to generate the second poisoning data.

Figure 1D:
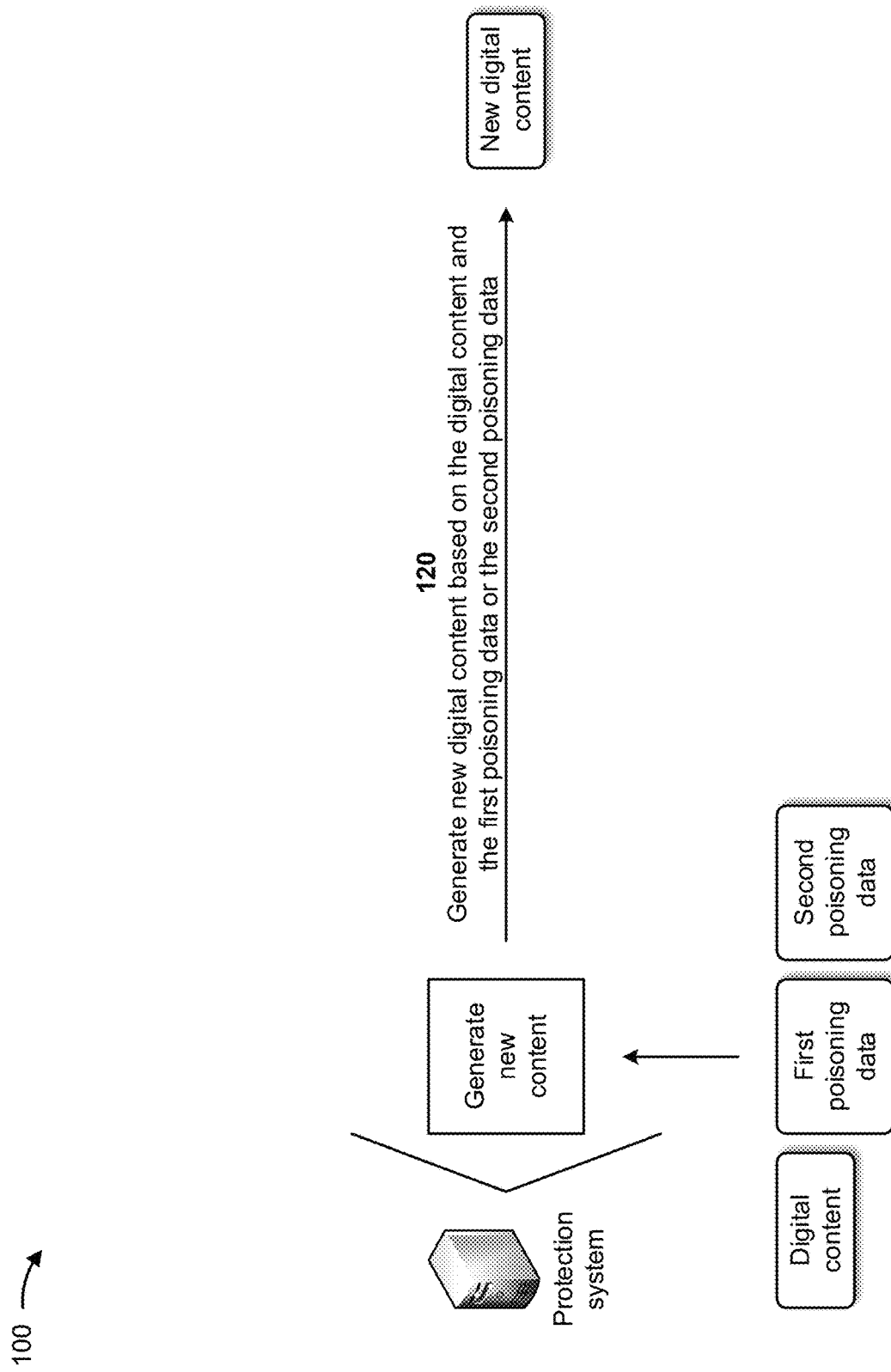

As shown in FIG. 1D, and by reference number 120, the protection system may generate new digital content based on the digital content and the first poisoning data or the second poisoning data. In some implementations, the protection system generates the new digital content based on the digital content and the first poisoning data, based on the digital content and the second poisoning data, or based on the digital content, the first poisoning data, and the second poisoning data.

For example, the protection platform may replace original pixels in the digital content (e.g., the clean image) with the poisoned pixels from the first poisoning data. In another example, the protection platform may replace original pixels in the digital content with the poisoned pixels from the second poisoning data. In still another example, the protection platform may replace original pixels in the digital content with the poisoned pixels from the first poisoning data and the second poisoning data. The poisoned pixels of the new digital content may be undetectable to a human eye so that the new digital content and the digital content may look the same to the human eye.

Figure 1E:
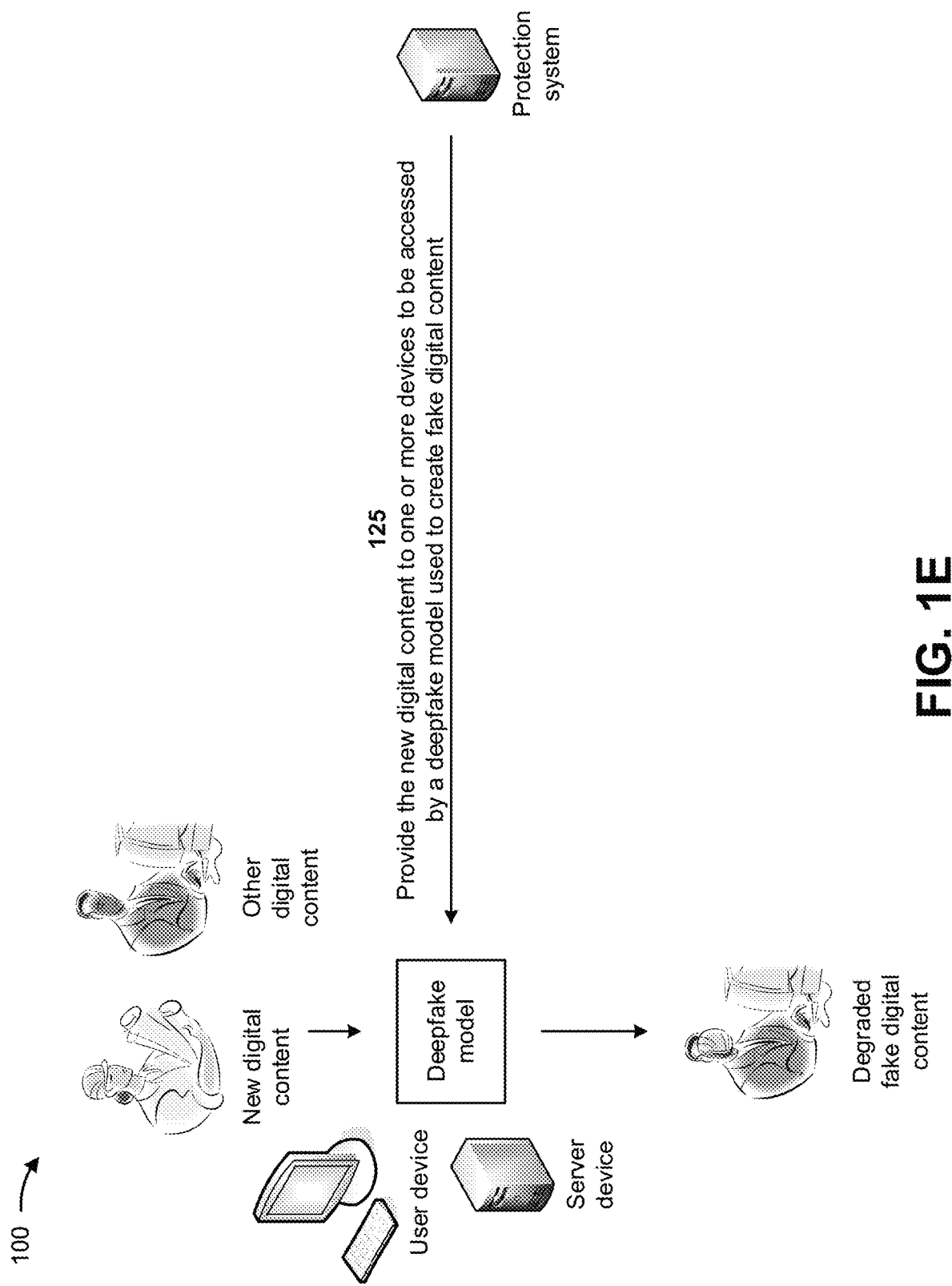

As shown in FIG. 1E, and by reference number 125, the protection system may provide the new digital content to one or more devices (e.g., the user device and/or the server device) to be accessed by an artificial intelligence-based model (e.g., a deepfake model) used to create fake digital content. In some implementations, the one or more devices are associated with an owner and/or a creator of the digital content. The user device and/or the server device may receive the new digital content and may store the new digital content in a data structure (e.g., a database, a list, a table, and/or the like) associated with the user device and/or the server device. The deepfake model may be authorized by the one or more devices to receive the new digital content. Alternatively, the deepfake model may be unauthorized by the one or more devices to receive the new digital content, but the deepfake model may inappropriately receive the new digital content.

As further shown in FIG. 1E, the deepfake model may receive the new digital content from the one or more devices and may receive other digital content from the one or more devices or from one or more other sources. The deepfake model may process the new digital content and the other digital content to generate degraded fake digital content. For example, if the new digital content is an image of person A (e.g., with poisoned pixels) and the other digital content is an image of person B, the deepfake model may process the image of person A and the image of person B to generate a combined image of person A and person B. However, the poisoned pixels in the new digital content may cause the combined image to be easily recognizable as fake or altered digital content (e.g., by obscuring or deforming a face of person A).

Figure 1F:
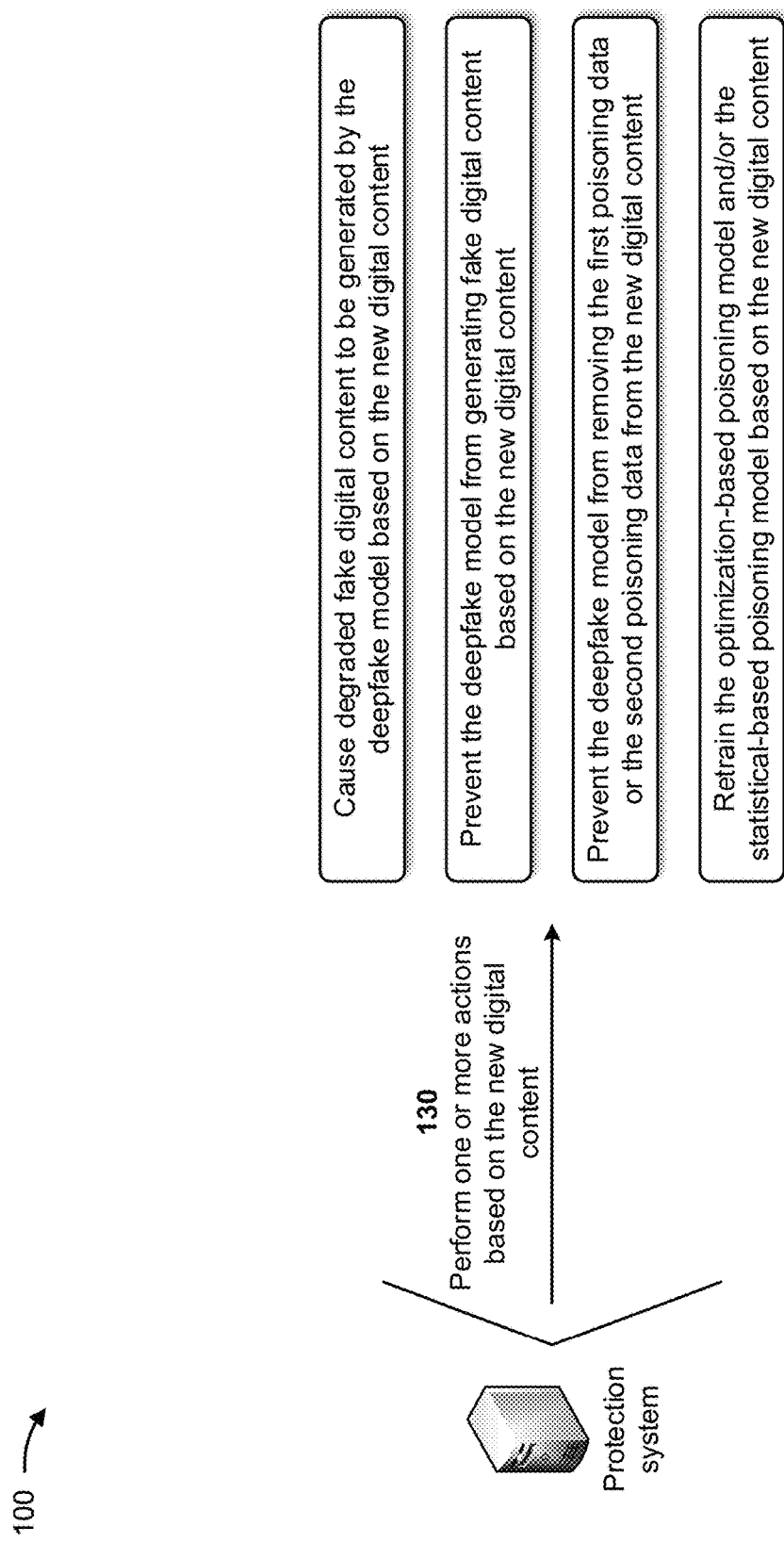

As shown in FIG. 1F, and by reference number 130, the protection system may perform one or more actions based on the new digital content. In some implementations, the one or more actions include the protection system causing degraded fake digital content to be generated by the deepfake model based on the new digital content. Using the example described above, the deepfake model may process the image of person A and the image of person B to generate the combined image of person A and person B. However, the poisoned pixels in the new digital content may cause the combined image to be degraded fake digital content. In this way, the protection system conserves computing resources, networking resources, human resources, and/or the like that would otherwise have been wasted in managing the digital content, policing unauthorized manipulation of the digital content, correcting misconceptions about manipulated digital content, and/or the like.

In some implementations, the one or more actions include the protection system preventing the deepfake model from generating fake digital content based on the new digital content. Using the example described above, the deepfake model may process the image of person A and the image of person B to generate the combined image of person A and person B. However, the poisoned pixels in the new digital content may prevent the deepfake model from generating fake digital content (e.g., that is not degraded) from the combined image. In this way, the protection system conserves computing resources, networking resources, human resources, and/or the like that would otherwise have been wasted in managing the digital content, policing the fake digital content, correcting misconceptions about the fake digital content, and/or the like.

In some implementations, the one or more actions include the protection system preventing the deepfake model from removing the first poisoning data and/or the second poisoning data from the new digital content. Using the example described above, the deepfake model may process the image of person A and the image of person B to generate the combined image of person A and person B. However, the deepfake model is unable to remove the poisoned pixels in the new digital content (e.g., from the image of person A). Thus, the poisoned pixels in the new digital content causes the combined image to be degraded fake digital content. In this way, the protection system conserves computing resources, networking resources, human resources, and/or the like that would otherwise have been wasted in managing the digital content, policing unauthorized manipulation of the digital content, correcting misconceptions about manipulated digital content, and/or the like.

In some implementations, the one or more actions include the protection system retraining the optimization-based poisoning model and/or the statistical-based poisoning model based on the new digital content. The protection system may utilize the new digital content as additional training data for retraining the optimization-based poisoning model and/or the statistical-based poisoning model, thereby increasing the quantity of training data available for training the optimization-based poisoning model and/or the statistical-based poisoning model. Accordingly, the protection system may conserve computing resources associated with identifying, obtaining, and/or generating historical data for training the optimization-based poisoning model and/or the statistical-based poisoning model relative to other systems for identifying, obtaining, and/or generating historical data for training machine learning models.

In this way, the protection system protects digital content against artificial intelligence-based unauthorized manipulation of the digital content. The protection system may process digital content, with a poisoning model, to generate poisoning data, may generate new digital content based on the digital content and the poisoning data, and may provide the new digital content to a deepfake model. The poisoning data may include visually unnoticeable noise and/or changes that prevent deepfake models from generating an irrelevant, malicious, or infringing content. The poisoning data added to the digital content is impossible to detect visually for the digital content, and thus, does not impact legitimate uses of the digital content. In addition, the poisoning data cannot be removed by the unauthorized parties, and thus, protects the digital content against unauthorized manipulation. This, in turn, conserves computing resources, networking resources, human resources, and/or the like that would otherwise have been wasted in managing digital content, policing unauthorized manipulation of the digital content, correcting misconceptions about manipulated digital content, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
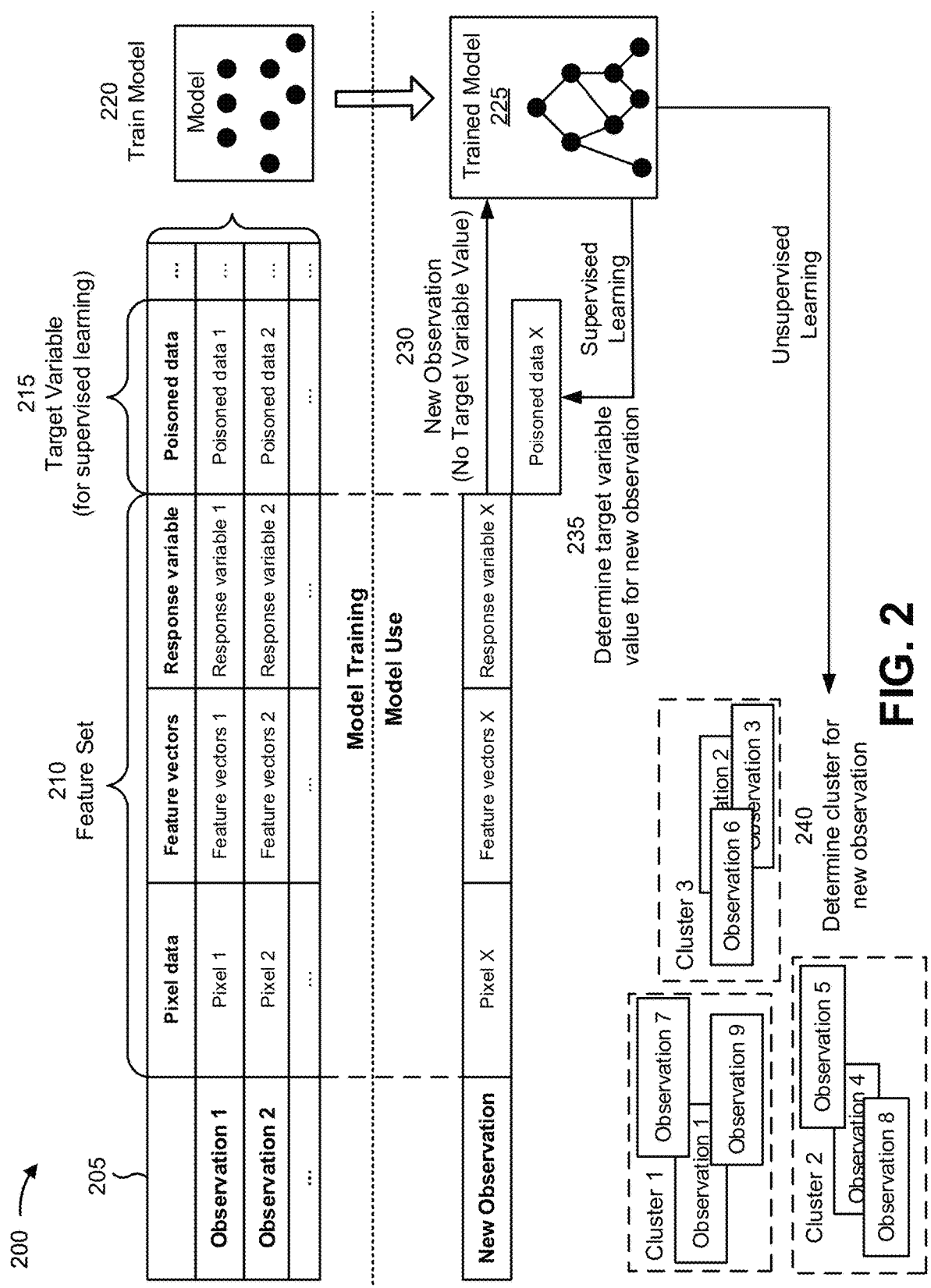
FIG. 2 is a diagram illustrating an example of training and using a machine learning model in connection with protecting digital content against artificial intelligence-based unauthorized manipulation of the digital content.

FIG. 2 is a diagram illustrating an example 200 of training and using a machine learning model (e.g., the optimized-based poisoning model or the statistical-based poisoning model) in connection with protecting digital content against artificial intelligence-based unauthorized manipulation of the digital content. The machine learning model training and usage described herein may be performed using a machine learning system. The machine learning system may include or may be included in a computing device, a server, a cloud computing environment, and/or the like, such as the protection system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the protection system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the protection system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of pixel data, a second feature of feature vectors, a third feature of a response variable, and so on. As shown, for a first observation, the first feature may have a value of pixel 1, the second feature may have a value of feature vectors 1, the third feature may have a value of response variable 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is poisoned data, which has a value of poisoned data 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of pixel X, a second feature of feature vectors X, a third feature of response variable X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of poisoned data X for the target variable of poisoned data for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a pixel data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a feature vectors cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to protect digital content against artificial intelligence-based unauthorized manipulation of the digital content. The machine learning system enables recognition and/or identification of tens, hundreds, thousands, or millions of features and/or feature values for tens, hundreds, thousands, or millions of observations, thereby increasing accuracy and consistency and reducing delay associated with protecting digital content against artificial intelligence-based unauthorized manipulation of the digital content relative to requiring computing resources to be allocated for tens, hundreds, or thousands of operators to manually protect digital content against artificial intelligence-based unauthorized manipulation of the digital content.

As indicated above, FIG. 2 is provided as an example. Other examples may differ from what is described in connection with FIG. 2.

Figure 3:
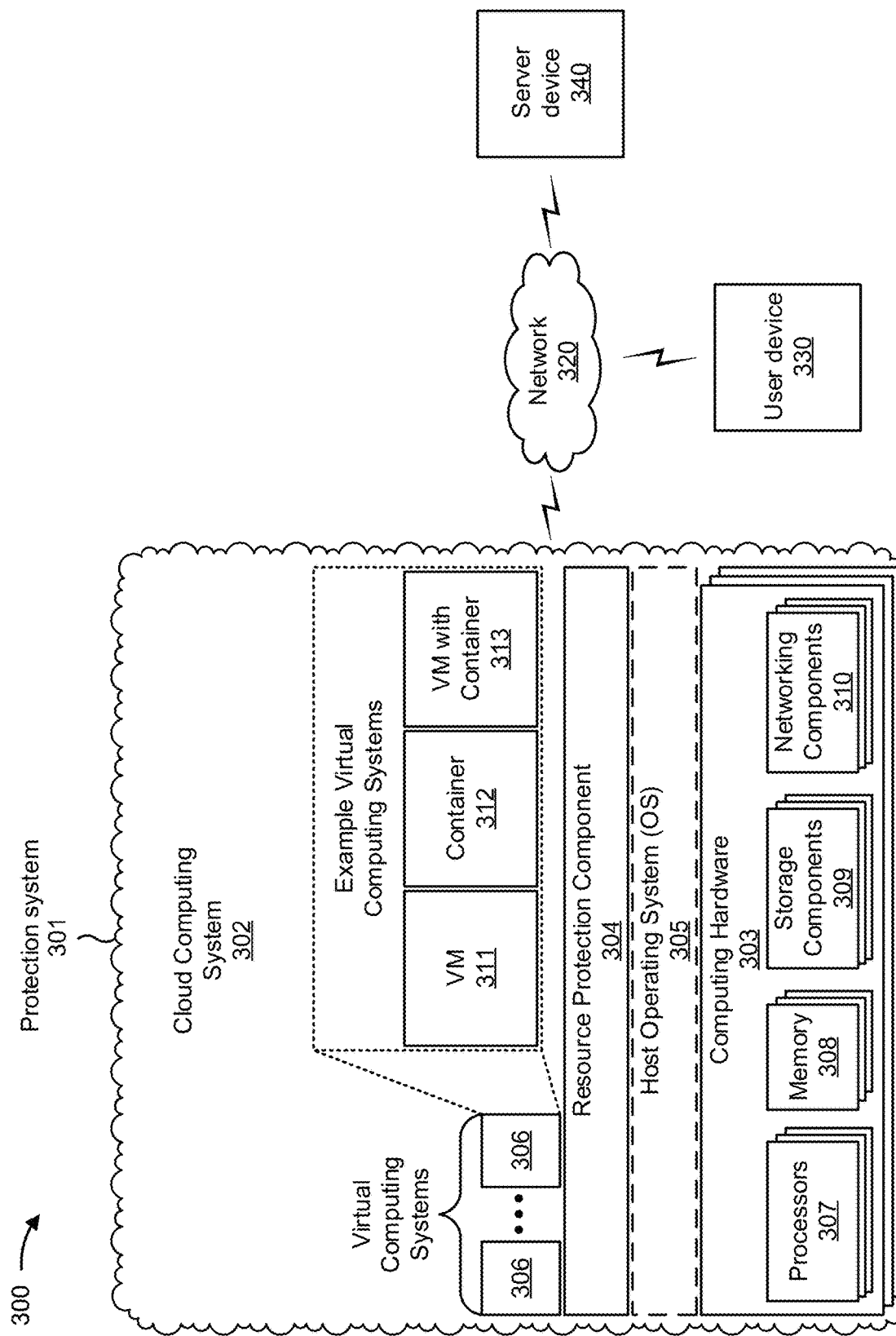
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a protection system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the protection system 301 may include one or more elements 303-313 of the cloud computing system 302, may execute within the cloud computing system 302, and/or may be hosted within the cloud computing system 302, in some implementations, the protection system 301 may not be cloud-based (e.g., may be implemented outside of a cloud computing system) or may be partially cloud-based. For example, the protection system 301 may include one or more devices that are not part of the cloud computing system 302, such as device 400 of FIG. 4, which may include a standalone server or another type of computing device. The protection system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Server device 340 includes one or more devices capable of receiving, generating, storing, processing, providing, and/or routing information, as described elsewhere herein. Server device 340 may include a communication device and/or a computing device. For example, server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
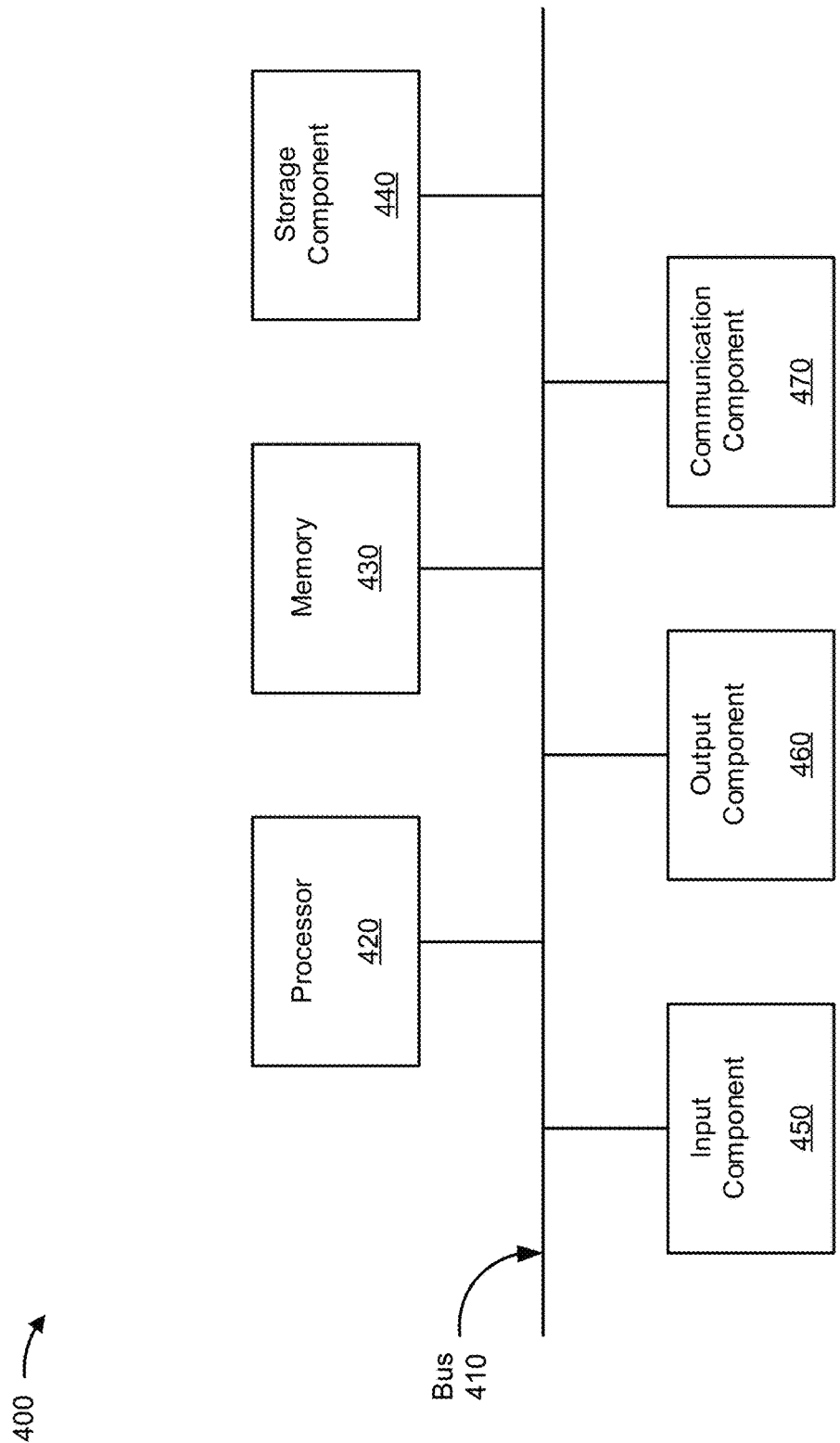
FIG. 4 is a diagram of example components of one or more devices of FIG. 3.

FIG. 4 is a diagram of example components of a device 400, which may correspond to protection system 301, user device 330, and/or server device 340. In some implementations, protection system 301, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
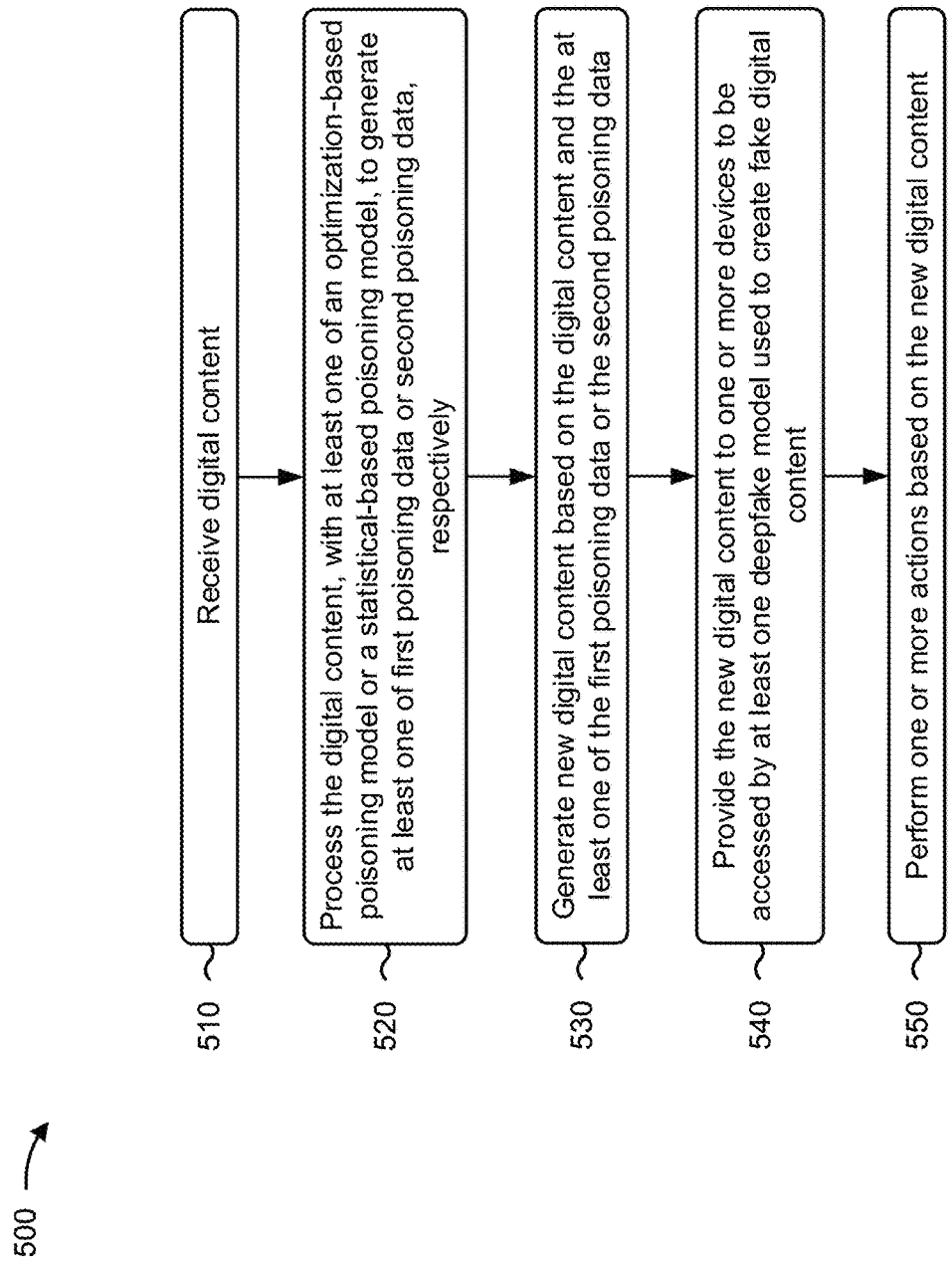
FIG. 5 is a flowchart of an example process for protecting digital content against artificial intelligence-based unauthorized manipulation of the digital content.

FIG. 5 is a flowchart of an example process 500 for protecting digital content against artificial intelligence-based unauthorized manipulation of the digital content. In some implementations, one or more process blocks of FIG. 5 may be performed by a device (e.g., protection system 301). In some implementations, one or more process blocks of FIG. 5 may be performed by another device or a group of devices separate from or including the device, such as a user device (e.g., user device 330) and/or a server device (e.g., server device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving digital content (block 510). For example, the device may receive digital content, as described above.

As further shown in FIG. 5, process 500 may include processing the digital content, with at least one of an optimization-based poisoning model or a statistical-based poisoning model, to generate at least one of first poisoning data or second poisoning data, respectively (block 520). For example, the device may process the digital content, with at least one of an optimization-based poisoning model or a statistical-based poisoning model, to generate at least one of first poisoning data or second poisoning data, respectively, as described above.

As further shown in FIG. 5, process 500 may include generating new digital content based on the digital content and the at least one of the first poisoning data or the second poisoning data (block 530). For example, the device may generate new digital content based on the digital content and the at least one of the first poisoning data or the second poisoning data, as described above.

As further shown in FIG. 5, process 500 may include providing the new digital content to one or more devices to be accessed by at least one deepfake model used to create fake digital content (block 540). For example, the device may provide the new digital content to one or more devices to be accessed by at least one deepfake model used to create fake digital content, as described above.

As further shown in FIG. 5, process 500 may include performing one or more actions based on the new digital content (block 550). For example, the device may perform one or more actions based on the new digital content, as described above.

Process 500 may include additional implementations, such as any single implementation or any combination of implementations described below and/or in connection with one or more other processes described elsewhere herein.

In a first implementation, processing the digital content, with the at least one of the optimization-based poisoning model or the statistical-based poisoning model, to generate the at least one of the first poisoning data or the second poisoning data includes manipulating one or more pixels of the digital content so that the one or more manipulated pixels are undetectable to a human eye, wherein the one or more manipulated pixels correspond to the first poisoning data.

In a second implementation, alone or in combination with the first implementation, processing the digital content, with the at least one of the optimization-based poisoning model or the statistical-based poisoning model, to generate the at least one of the first poisoning data or the second poisoning data includes processing one or more pixels of the digital content, with a gradient ascent model, to maximize a loss function of the at least one deepfake model; and optimizing the one or more pixels, by updating feature vectors of the one or more pixels, to generate the first poisoning data.

In a third implementation, alone or in combination with one or more of the first and second implementations, processing the digital content, with the at least one of the optimization-based poisoning model or the statistical-based poisoning model, to generate the at least one of the first poisoning data or the second poisoning data includes receiving a sample taken from a multivariate normal distribution with a mean and a covariance estimated from the digital content; rounding feature values of the sample to identify a portion of the sample that poisons pixels of the digital content; selecting a response variable value of the sample to identify pixels of the digital content to poison; and poisoning the identified pixels of the digital content with the portion of the sample to generate the second poisoning data.

In a fourth implementation, alone or in combination with one or more of the first through third implementations, processing the digital content, with the at least one of the optimization-based poisoning model or the statistical-based poisoning model, to generate the at least one of the first poisoning data or the second poisoning data includes manipulating one or more pixels of the digital content so that the one or more manipulated pixels are undetectable to a human eye, wherein the one or more manipulated pixels correspond to the second poisoning data.

In a fifth implementation, alone or in combination with one or more of the first through fourth implementations, generating the new digital content based on the digital content and the at least one of the first poisoning data or the second poisoning data includes replacing original pixels in the digital content with poisoned pixels from the first poisoning data to generate the new digital content, or replacing the original pixels in the digital content with poisoned pixels from the second poisoning data to generate the new digital content.

In a sixth implementation, alone or in combination with one or more of the first through fifth implementations, performing the one or more actions based on the new digital content includes causing generation of degraded fake digital content by the at least one deepfake model based on the new digital content, or preventing the at least one deepfake model from generating fake digital content based on the new digital content.

In a seventh implementation, alone or in combination with one or more of the first through sixth implementations, performing the one or more actions based on the new digital content includes preventing the at least one artificial intelligence model from removing the first poisoning data or the second poisoning data from the new digital content, or retraining the optimization-based poisoning model or the statistical-based poisoning model based on the new digital content.

In an eighth implementation, alone or in combination with one or more of the first through seventh implementations, providing the new digital content to the one or more devices to be accessed by the at least one artificial intelligence model causes degraded fake digital content to be generated by the at least one artificial intelligence model.

In a ninth implementation, alone or in combination with one or more of the first through eighth implementations, the optimization-based poisoning model includes a back-gradient optimization poisoning model, and the statistical-based poisoning model includes a multivariate normal distribution model.

In a tenth implementation, alone or in combination with one or more of the first through ninth implementations, the digital content includes an image or a video.

In an eleventh implementation, alone or in combination with one or more of the first through tenth implementations, the first poisoning data or the second poisoning data includes visually unnoticeable noise or changes that prevent the at least one artificial intelligence model from generating fake digital content based on the new digital content.

In a twelfth implementation, alone or in combination with one or more of the first through eleventh implementations, providing the new digital content to the one or more devices to be accessed by the at least one artificial intelligence model prevents the at least one artificial intelligence model from combining the new digital content with other content to generate fake digital content.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, digital content;
processing, by the device, the digital content, with at least one of an optimization-based poisoning model or a statistical-based poisoning model, to generate at least one of first poisoning data or second poisoning data, respectively;
generating, by the device, new digital content based on the digital content and the at least one of the first poisoning data or the second poisoning data;
providing, by the device, the new digital content to one or more devices to be accessed by at least one deepfake model used to create fake digital content; and
performing, by the device, one or more actions based on the new digital content,
wherein performing the one or more actions based on the new digital content comprises one or more of:
causing generation of degraded fake digital content by the at least one deepfake model based on the new digital content; or
preventing the at least one deepfake model from generating the fake digital content based on the new digital content.

2. The method of claim 1, wherein processing the digital content, with the at least one of the optimization-based poisoning model or the statistical-based poisoning model, to generate the at least one of the first poisoning data or the second poisoning data comprises:
manipulating one or more pixels of the digital content so that the one or more manipulated pixels are undetectable to a human eye,
wherein the one or more manipulated pixels correspond to the first poisoning data.

3. The method of claim 1, wherein processing the digital content, with the at least one of the optimization-based poisoning model or the statistical-based poisoning model, to generate the at least one of the first poisoning data or the second poisoning data comprises:
processing one or more pixels of the digital content, with a gradient ascent model, to maximize a loss function of the at least one deepfake model; and
optimizing the one or more pixels, by updating feature vectors of the one or more pixels, to generate the first poisoning data.

4. The method of claim 1, wherein processing the digital content, with the at least one of the optimization-based poisoning model or the statistical-based poisoning model, to generate the at least one of the first poisoning data or the second poisoning data comprises:
receiving a sample taken from a multivariate normal distribution with a mean and a covariance estimated from the digital content;
rounding feature values of the sample to identify a portion of the sample that poisons pixels of the digital content;
selecting a response variable value of the sample to identify pixels of the digital content to poison; and
poisoning the identified pixels of the digital content with the portion of the sample to generate the second poisoning data.

5. The method of claim 1, wherein processing the digital content, with the at least one of the optimization-based poisoning model or the statistical-based poisoning model, to generate the at least one of the first poisoning data or the second poisoning data comprises:
manipulating one or more pixels of the digital content so that the one or more manipulated pixels are undetectable to a human eye,
wherein the one or more manipulated pixels correspond to the second poisoning data.

6. The method of claim 1, wherein generating the new digital content based on the digital content and the at least one of the first poisoning data or the second poisoning data comprises one of:
replacing original pixels in the digital content with poisoned pixels from the first poisoning data to generate the new digital content; or
replacing the original pixels in the digital content with poisoned pixels from the second poisoning data to generate the new digital content.

7. The method of claim 1, wherein performing the one or more actions based on the new digital content further comprises one or more of:
retraining the optimization-based poisoning model or the statistical-based poisoning model based on the new digital content; or
preventing the at least one deepfake model from removing the first poisoning data or the second poisoning data from the new digital content.

8. A device, comprising:
one or more memories; and
one or more processors, communicatively coupled to the one or more memories, configured to:
receive digital content;
process the digital content, with at least one of an optimization-based poisoning model or a statistical-based poisoning model, to generate at least one of first poisoning data or second poisoning data, respectively;
generate new digital content based on the digital content and the least one of the first poisoning data or the second poisoning data;
provide the new digital content to one or more devices to be accessed by at least one artificial intelligence model used to create fake digital content; and
perform one or more actions based on the new digital content,
wherein the one or more processors, when performing the one or more actions based on the new digital content, are configured to one or more of:
prevent the at least one artificial intelligence model from removing the first poisoning data or the second poisoning data from the new digital content; or
retrain the optimization-based poisoning model or the statistical-based poisoning model based on the new digital content.

9. The device of claim 8, wherein the one or more processors, when performing the one or more actions based on the new digital content, are further configured to:

prevent the at least one artificial intelligence model from generating the fake digital content the new digital content.

10. The device of claim 8, wherein providing the new digital content to the one or more devices to be accessed by the at least one artificial intelligence model causes degraded fake digital content to be generated by the at least one artificial intelligence model.

11. The device of claim 8, wherein:
the optimization-based poisoning model includes a back-gradient optimization poisoning model, and the statistical-based poisoning model includes a multivariate normal distribution model.

12. The device of claim 8, wherein the digital content includes one of: an image, or
a video.

13. The device of claim 8, wherein the first poisoning data or the second poisoning data includes visually unnoticeable noise or changes that prevent the at least one artificial intelligence model from generating the fake digital content based on the new digital content.

14. The device of claim 8, wherein providing the new digital content to the one or more devices to be accessed by the at least one artificial intelligence model prevents the at least one artificial intelligence model from combining the new digital content with other content to generate the fake digital content.

15. A non-transitory computer-readable medium storing a set of instructions, the set of instructions comprising:
one or more instructions that, when executed by one or more processors of a device, cause the device to:
receive digital content;
process the digital content, with at least one of an optimization-based poisoning model or a statistical-based poisoning model, to generate at least one of first poisoning data or second poisoning data,
wherein the process the digital content comprises:
receiving a sample taken from a multivariate normal distribution with a mean and a covariance estimated from the digital content;
rounding feature values of the sample to identify a portion of the sample that poisons pixels of the digital content;
selectin a response variable value of the sample to identify pixels of the digital content to poison; and
poisoning the identified pixels of the digital content with the portion of the sample to generate the second poisoning data;
generate new digital content based on the digital content and the at least one of the first poisoning data or the second poisoning data;
provide the new digital content to one or more devices to be accessed by at least one deepfake model, used to create fake digital content; and
cause generation of degraded fake digital content by the at least one deepfake model.

16. The non-transitory computer-readable medium of claim 15, wherein the one or more instructions, that cause the device to process the digital content, with the at least one of the optimization-based poisoning model or the statistical-based poisoning model, to generate the at least one of the first poisoning data or the second poisoning data, cause the device to:
manipulate one or more pixels of the digital content so that the one or more manipulated pixels are undetectable to a human eye,
wherein the one or more manipulated pixels correspond to the first poisoning data.

17. The non-transitory computer-readable medium of claim 15, wherein the one or more instructions, that cause the device to process the digital content, with the at least one of the optimization-based poisoning model or the statistical-based poisoning model, to generate the at least one of the first poisoning data or the second poisoning data, cause the device to:
process one or more pixels of the digital content, with a gradient ascent model, to maximize a loss function of the at least one deepfake model; and
optimize the one or more pixels, by updating feature vectors of the one or more pixels, to generate the first poisoning data.

18. The non-transitory computer-readable medium of claim 15, wherein the one or more instructions, that cause the device to process the digital content, with the at least one of the optimization-based poisoning model or the statistical-based poisoning model, to generate the at least one of the first poisoning data or the second poisoning data, cause the device to:
manipulate one or more pixels of the digital content so that the one or more manipulated pixels are undetectable to a human eye,
wherein the one or more manipulated pixels correspond to the second poisoning data.

19. The non-transitory computer-readable medium of claim 15, wherein the one or more instructions, that cause the device to generate the new digital content based on the digital content and the at least one of the first poisoning data or the second poisoning data, cause the device to one of:
replace original pixels in the digital content with poisoned pixels from the first poisoning data to generate the new digital content; or
replace the original pixels in the digital content with poisoned pixels from the second poisoning data to generate the new digital content.

* * * * *